United States Patent
Kim et al.

(10) Patent No.: US 7,881,417 B2
(45) Date of Patent: Feb. 1, 2011

(54) DEMODULATION METHOD USING PHASE DETECTION AND APPARATUS THEREOF

(75) Inventors: Hyun-chin Kim, Seongnam-si (KR); Woo-young Choi, Seoul (KR); Young-kwang Seo, Seoul (KR); Du-ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 11/837,116

(22) Filed: Aug. 10, 2007

(65) Prior Publication Data

US 2008/0116968 A1 May 22, 2008

(30) Foreign Application Priority Data

Nov. 22, 2006 (KR) .............. 10-2006-0115948

(51) Int. Cl.
   *H04L 7/00* (2006.01)
(52) U.S. Cl. .............. 375/355; 375/226; 375/326
(58) Field of Classification Search ............. 375/355, 375/360, 371, 326, 226
   See application file for complete search history.

(56) References Cited

U.S. PATENT DOCUMENTS

| | | | |
|---|---|---|---|
| 5,859,881 A * | 1/1999 | Ferraiolo et al. ............. 375/350 |
| 5,872,531 A * | 2/1999 | Johnson et al. ............. 341/110 |
| 6,208,701 B1 | 3/2001 | Hiramatsu et al. |
| 6,370,188 B1 * | 4/2002 | Wu et al. ............. 375/222 |
| 6,456,677 B1 * | 9/2002 | Hiramatsu et al. ............. 375/354 |

FOREIGN PATENT DOCUMENTS

| | | |
|---|---|---|
| CN | 1175151 A | 3/1998 |
| JP | 2004-064469 A | 2/2004 |
| JP | 2004-312146 A | 11/2004 |

OTHER PUBLICATIONS

Office Action dated May 11, 2010 issued by the Japanese Patent Office in Japanese Patent Application No. 2007-168822.
Office Action dated Jun. 28, 2010 issued by State Intellectual Property Office of PR China in Chinese Patent Application No. 200710136029.2.

* cited by examiner

*Primary Examiner*—Kevin Y Kim
(74) *Attorney, Agent, or Firm*—Sughrue Mion, PLLC

(57) ABSTRACT

A demodulation method using phase detection and an apparatus thereof are provided. The demodulation method includes detecting phase information by sampling a received signal, synchronizing at least one clock signal by using the detected phase information, oversampling the received signal by the synchronized clock signal, and demodulating the received signal by using the oversampled result. With this, the demodulating apparatus can demodulate the modulated signal by using the phase detection, and use a digital filter as a filter for removing a jitter from the demodulated signal, thereby allowing a size thereof to be minimized.

13 Claims, 4 Drawing Sheets

DEMODULATION METHOD USING PHASE DETECTION AND APPARATUS THEREOF

CROSS-REFERENCE TO RELATED APPLICATIONS

This application claims the benefit under 35 U.S.C. §119(a) of Korean Patent Application No. 10-2006-0115948, filed Nov. 22, 2006, in the Korean Intellectual Property Office, the entire disclosure of which is incorporated herein by reference.

FIELD OF THE INVENTION

Methods and apparatuses consistent with the present invention relate generally to signal demodulation, and more particularly, to demodulating a signal by using phase detection.

BACKGROUND OF THE INVENTION

Phase shift keying (PSK) is a method, for taking data on a high frequency of carrier wave and sending it. PSK transmits a signal in which converting any one of a phase, an amplitude and a frequency of the carrier wave or a combination, thereof, in converted into digital data of 0 and 1.

In the PSK method, there is known a binary phase shift keying (BPSK) method, which transmits digital signals of two values (0 and 1) while making them correspond to 0 phase and $\pi$ phase of the carrier wave, respectively. There is also known a quadrature phase shift keying (QPSK) method, which gathers and transmits two bits of 0 and 1, which are digital signals of two values, while making them correspond to four phases of the carrier wave.

Also, there are known an 8 PSK method, which can transmit information three times larger than in the BPSK method, and a 16 PSK method, which can transmit information four times larger than in the BPSK method, at the same frequency band as that of the BPSK method.

A method of recovering data from a received signal is known, which adjusts a sine wave of a receiving end to have the same phase as a carrier wave of a transmitting end by using a feedback loop and then multiplies the received signal by the adjusted sine wave to recover the data.

An apparatus, which is mostly used in such a method, is a COSTAS-loop. A construction of a related art COSTAS-loop as illustrated in FIG. 1. The COSTAS-loop illustrated in FIG. 1 is made up of first, second, and third mixers 110, 160, and 130, first and second low pass filters (LPF), a loop filter 140, and a voltage controlled oscillator (VCO) 150.

The first mixer 110 mixes a modulated signal $m(t)\cos(\omega t)$ inputted from the outside and a sine wave signal $\cos(\omega t+\theta)$, which is an oscillation signal outputted from the VCO 150, and supplies the mixed signal to the first low pass filter 120. The second mixer 160 mixes the modulated signal $m(t)\cos(\omega t)$ inputted from the outside and a sine wave signal $\sin(\omega t+\theta)$, which is an oscillation signal outputted from the VCO 150, and supplies the mixed signal to the second low pass filter 170. Thus, if a receiving end has a phase difference as much as $\theta$ to a carrier wave of a transmitting end, the signals outputted from the first and the second mixers 110 and 160 are as follows, respectively.

$$m(t)\cos(\omega t)\cos(\omega t+\theta)=m(t)\{\cos\theta+\cos(2\omega t+\theta)\}/2$$

$$m(t)\cos(\omega t)\sin(\omega t+\theta)=m(t)\{\sin\theta+\sin(2\omega t+\theta)\}/2$$

The first and the second low pass filters 120 and 170 pass only required signals of low frequency band with filtering jitter signals of high frequency band from the inputted signals. The signals outputted from the first and the second low pass filters 120 and 170 are $m(t)\cos\theta$ and $m(t)\sin\theta$, respectively. Since $\theta$ converges to 0, m(t) can be recovered when a phase difference comes to 0.

The third mixer 130 mixes the signals outputted from the first and the second low pass filters 120 and 170 and supplies the mixed signal to the loop filter 140. The mixed signal is supplied to the VCO 150 via the loop filter 140. The VCO 150 produces oscillation signals according to a voltage control on basis of the signal outputted from the loop filter 140, and supplies the oscillation signals, which have a phase difference of 90° to each other, to the first and the second mixers 110 and 120, respectively.

However, to recover a carrier wave of high frequency, when the COSTAS-loop as described above is used, there is a difficulty in embodying the LPF. Particularly, in embodying the LPF, which is an analog filter, even though a RC filter having simplified structure is used, a flatness of frequency response at a high frequency is not good. Also, since capacitors occupy a large area, a problem occurs, in that it is difficult to fabricate a small filter.

SUMMARY OF THE INVENTION

An aspect of the present invention is to address at least the above problems and/or disadvantages and to provide at least the advantages described below. Accordingly, an aspect of the present invention is to provide a demodulation method and an apparatus thereof, which sample a modulated signal by using a phase detection and demodulate the modulated signal by using the sampled result, thereby allowing a low pass filter not to use.

Another aspect is to provide a demodulation apparatus, which use a digital filter as a filter for removing a jitter from a demodulated signal, thereby allowing a size thereof to be minimized.

According to an aspect of an exemplary embodiment of the present invention, there is provided a demodulation method, including: detecting phase information by sampling a received signal, synchronizing at least one clock by using the detected phase information, oversampling the received signal by the synchronized clock, and demodulating the received signal by using the oversampled result.

The oversampling may include measuring levels of the received signal at rising edges and falling edges of the synchronized clock.

The demodulating may include non-reversing the levels measured at the rising edges of the synchronized clock and reversing the levels measured at the falling edges of the synchronized clock.

The number of the synchronized clock may be greater than two.

The synchronized clock used at the oversampling may have a predetermined phase difference to a carrier wave included in the received signal.

The predetermined phase difference may be positive number times as large as a value obtained by dividing $\pi$ by the number of the synchronized clock.

The oversampling may include sampling the received signal at least more than two times during a clock period.

The method may further include removing a jitter from the demodulated signal.

According to an aspect of an exemplary embodiment of the present invention, there is provided a demodulation apparatus, including a phase detecting unit to detect phase information by sampling a received signal, a clock control unit to synchronize at least one clock by using the detected phase information, and a demodulating unit to oversample the received signal by the synchronized clock, and to demodulate the received signal by using the oversampled result.

The demodulating unit may measure levels of the received signal at rising edges and falling edges of the synchronized clock.

The demodulating unit does not reverse the levels measured at the rising edges of the synchronized clock and reverses the levels measured at the falling edges of the synchronized clock.

The number of the synchronized clock may be greater than two.

The synchronized clock used by the demodulating unit may have a predetermined phase difference to a carrier wave included in the received signal.

The predetermined phase difference may be positive number times as large as a value obtained by dividing $\pi$ by the number of the synchronized clock.

The demodulating unit may sample the received signal at least more than two times during a clock period.

The apparatus may further include a filter to remove a jitter from the demodulated signal.

The filter may include a digital filter.

BRIEF DESCRIPTION OF THE DRAWING FIGURES

The above other aspects of the present invention will become more apparent by describing in detail exemplary embodiments thereof with reference to the attached drawing figures, wherein.

Figure 4:
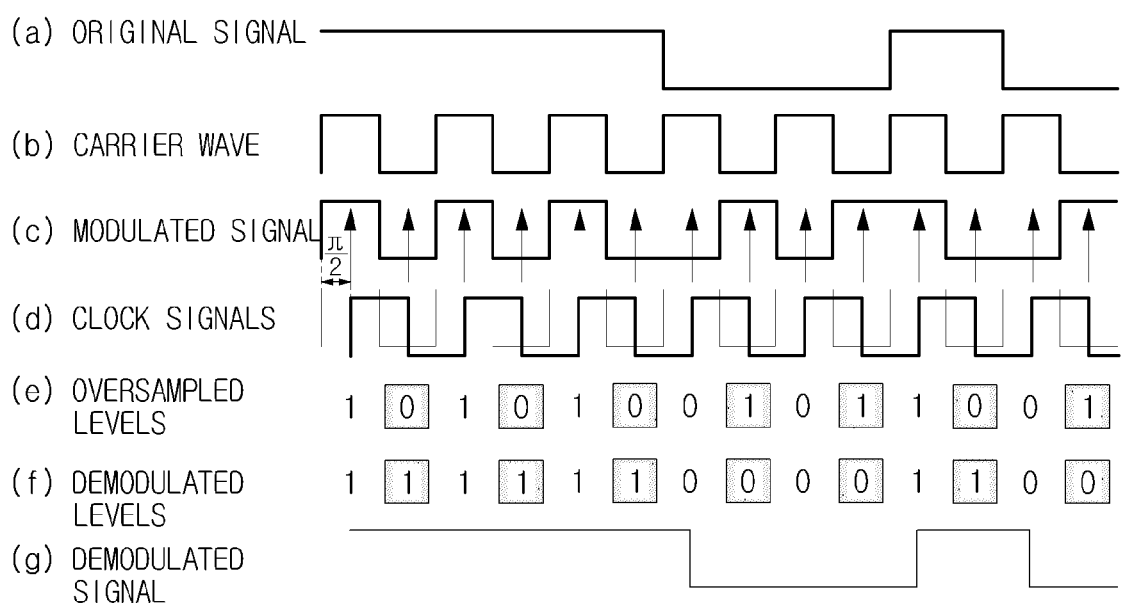
Figure 5:
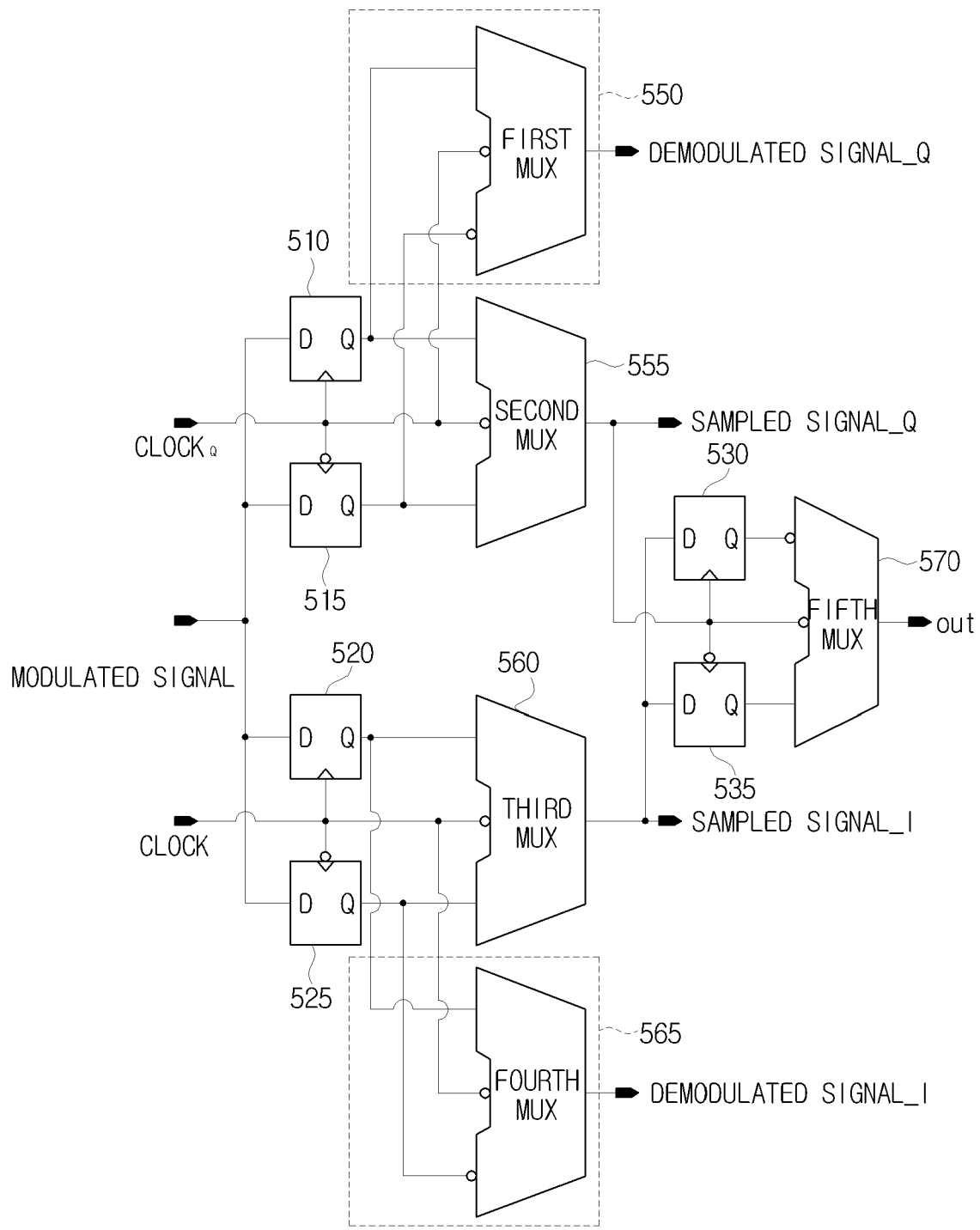

FIG. 4 is a timing diagram exemplifying an operation of a demodulating unit of the demodulation apparatus in accordance with an exemplary embodiment of the present invention, which demodulates the received signal by using the phase detection; and FIG. 5 is a circuit diagram exemplifying a phase detecting unit and the demodulating unit of the demodulation apparatus in accordance with an exemplary embodiment of the present invention.

DETAILED DESCRIPTION OF THE EXEMPLARY EMBODIMENTS

Hereinafter, a demodulation method and an apparatus thereof in accordance with exemplary embodiments of the present invention will be described in detail with reference to the accompanying drawing figures. Throughout the drawings, the same drawing reference numerals will be understood to refer to the same elements, features, and structures.

Figure 1:
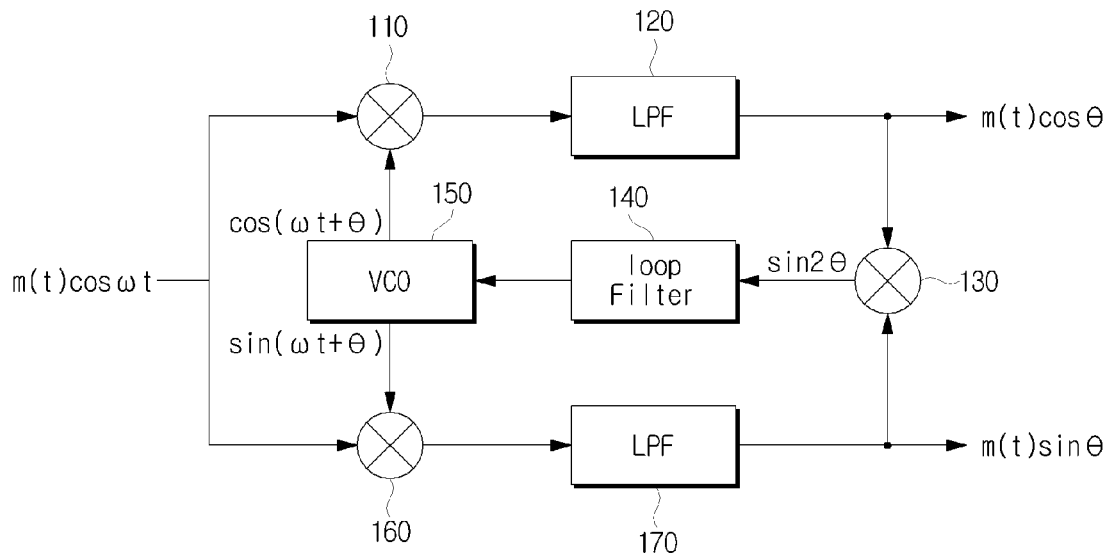
FIG. 1 is a block diagram exemplifying a construction of a related art COSTAS-loop.
Figure 2:
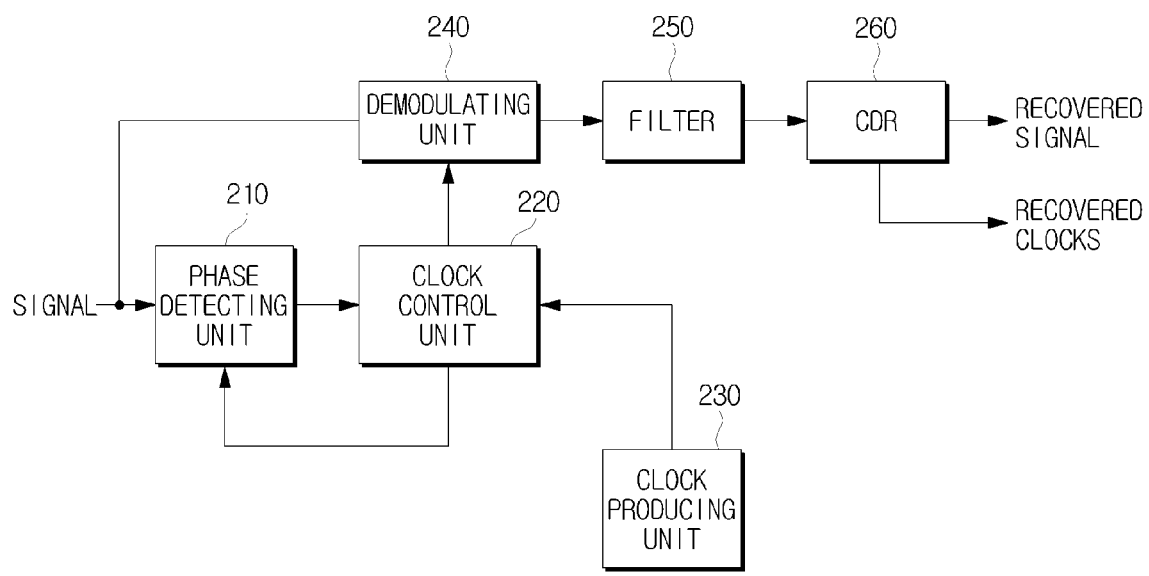
FIG. 2 is a block diagram exemplifying a demodulation apparatus, which demodulates a received signal by using a phase detection, in accordance with an exemplary embodiment of the present invention.

FIG. 2 is a block diagram exemplifying a demodulation apparatus, which demodulates a received signal by using phase detection, in accordance with an exemplary embodiment of the present invention. Referring to FIG. 2, the demodulation apparatus in accordance with the exemplary embodiment of the present invention is provided with a phase detecting unit 210, a clock control unit 220, a clock producing unit 230, a demodulating unit 240, a filter 250, and a clock data recovery (CDR) 260.

The phase detecting unit 210 samples a received signal by using clock signals to detect phase information of the received signal. Generally, the received signal is a modulated signal in which a carrier wave carries data. The clock control unit 220 synchronizes clock signals received from the clock producing unit 230 to have a predetermined phase difference to the carrier wave, on the basis of the phase information received from the phase detecting unit 210, and supplies the synchronizes clock signals to the phase detecting unit 210 and the demodulating unit 240. At this time, if the received signal is a BPSK signal, it is preferable that the clock control unit 220 synchronizes two clock signals, one of which is a clock having the same phase as that of the carrier wave and the other of which is a clock having a phase difference as much as $\pi/2$ to the carrier wave.

The clock producing unit 230 produces clock signals which are supplied to the clock control unit 220. At this time, it may be preferable that a frequency of the clock signals produced by the clock producing unit 230 is the same as that of the carrier wave. The clock producing unit 230 may be included in the clock control unit 220.

The demodulating unit 240 receives a signal, oversamples the received signal by using the synchronized clock signals, demodulates the received signal by using the oversampled result, and supplies the demodulated signal to the filter 250. The oversampling means that a sampling is carried out more than two times during a clock period. A method of demodulating the received signal by using the oversampled result will be described later.

The filter 250 removes a jitter, which exists in the demodulated signal outputted from the demodulating unit 240, and supplies the jitter-removed, demodulated signals to the CDR 260. The CDR 260 recovers clock signals and data from the demodulated signal supplied from the filter 250. The filter 250 and the CDR 260 may be optionally applied to the demodulation apparatus.

Figure 3:
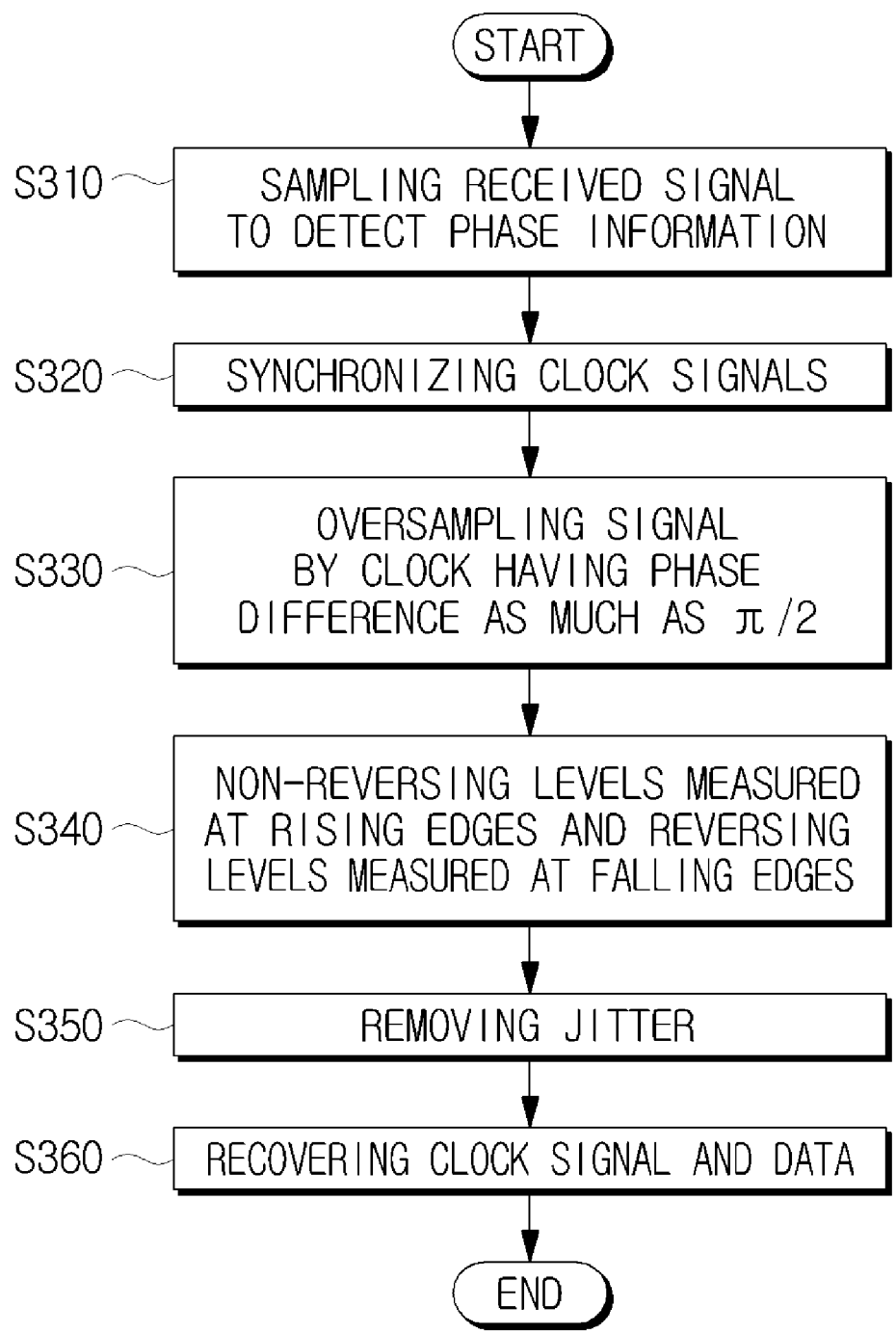
FIG. 3 is a flowchart exemplifying a method, which the demodulation apparatus in accordance with an exemplary embodiment of the present invention demodulates the received signal by using the phase detection.

Hereinafter, a method, which the demodulation apparatus illustrated in FIG. 2 demodulates the received signal, will be described in detail with reference to FIG. 3. FIG. 3 is a flowchart exemplifying a method, which the demodulation apparatus in accordance with an exemplary embodiment of the present invention demodulates a received signal by using a phase detection. For explanatory convenience, the received signal will be explained as a BPSK signal.

Referring to FIG. 3, first, the phase detecting unit 210 samples a received signal and thus detects phase information of the received signal (S310). At this time, clock signals are supplied from the clock control unit 220.

The clock control unit 220 synchronizes the clock signals to have a predetermined difference to a carrier wave of the received signal by using the phase information supplied from the phase detecting unit 210, and supplies the synchronized clock signals to the phase detecting unit 210 and the demodulating unit 240 (S320). At this time, it is preferable that the clock signals synchronized by the clock control unit 220 is two clock signals, one of which has the same phase as that of the carrier wave and the other of which has a phase difference as much as $\pi/2$ relative to the carrier wave.

The demodulating unit 240 oversamples the received signal by the clock signal having the phase difference as much as $\pi/2$ relative to the carrier wave out of the two synchronized clock signals (S330).

Also, the demodulating unit 240 demodulates the received signal by using the oversampled result. At this time, the demodulating unit 240 demodulates in such a manner that it does not reverse levels measured at rising edges of the synchronized clock signal, but reverses levels measured at falling edges of the synchronized clock signal (S340).

The filter 250 removes a jitter from the demodulated signal supplied from the demodulating unit 240 (S350). Also, since the signal inputted into the filter 250 is a digital signal, the filter 250 uses a digital filter unlike the conventional analog filter. The digital filter is advantageous in that it is easy to redesign conforming to a new process and occupies a small space as compared with the analog filter. Accordingly, the digital filter can embody the demodulation apparatus to be miniaturized.

Finally, the CDR 260 recovers clock signals and data from the demodulated signal supplied from the filter 250 (S360).

FIG. 4 is a timing diagram exemplifying an operation of the demodulating unit 240, which demodulates a received signal by using phase detection. For explanatory convenience, the received signal is explained as a BPSK signal, and a method of modulating by taking an original signal on a carrier wave and a method of demodulating the received signal by the demodulating unit 240 are explained together. Also, clock signals output from the clock control unit 220 are in a state where they have been already synchronized with the received signal.

It may be preferable that a waveform (a), as an original signal, is digital. A waveform (b) is a carrier wave. A modulated signal is produced by multiplying the original signal by the carrier wave. To be more specific, when a logic level of the carrier wave is 'high', a logic level of the modulated signal is 'high' if a logic level of the original signal is 'high'. Also, when the logic level of the carrier wave is 'high', but the logic level of the original signal is 'low', the logic level of the modulated signal is 'low'.

To the contrary, when the logic level of the carrier wave is 'low', but the logic level of the original signal is 'high', the logic level of the modulated signal is 'low', whereas when the logic level of the carrier wave is 'low', but the logic level of the original signal is 'low', the logic level of the modulated signal is 'high'. The signal modulated as described above is the same as illustrated in a waveform (c) of FIG. 4. If the signal modulated like the waveform (c) is supplied to the demodulating unit 240 of a receiver, that is, the demodulation apparatus, the demodulating unit 240 carries out an oversampling by using the supplied signal and clock signals. At this time, the clock signals, as clock signals synchronized by the clock control unit 220, have a predetermined phase difference to the received signal. In a wave form (d), a clock signal having the same phase as that of the carrier wave and a clock signal having a phase difference as much as $\pi/2$ relative to the carrier wave are shown. On the other end, even though in oversampling, the clock having the same phase as that of the carrier wave is used, it does not contribute in demodulating the signal. Accordingly, hereinafter, only a method of demodulating by using the only clock signal having the phase difference as much as $\pi/2$ to the carrier wave will be described.

The oversampling is carried out in such a manner that levels of the received signal at the rising edges and the falling edges of the clock signal are measured. The measured levels are the same as illustrated in (e) of FIG. 4.

Next, the demodulating unit 240 demodulates the received signal by using the oversampled result. At this time, the demodulating unit 240 does not reverse levels measured at the rising edges of the clock signal, but reverses levels measured at the falling edges of the clock signal. As a result, the obtained levels are the same as illustrated (f), and the demodulated signal is the same as a waveform (g) of FIG. 4.

After all, it can be appreciated that since the waveform (a), which is the original signal, is the same as the waveform (g), which is the demodulated signal, the received signal can be demodulated through the phase detection. Although the demodulated signal illustrated in FIG. 4 is assumed as a signal in an ideal case where a jitter is not generated in process of oversampling, it goes without saying that the demodulated signal may include the jitter generated in process of oversampling.

In FIG. 4, since the received signal is the BPSK signal, the number of the synchronized clock signals is two, and the received signal is oversampled two times during a level period in process of demodulation. However, even though the received signal is the BPSK signal, it can be demodulated by using more than three clock signals, which have a phase difference to each other. Thus, if the received signal is the BPSK signal, in order to demodulate it, more than two clock signals including a clock having the same phase as that of the carrier wave are required.

Also, in FIG. 4, although the received signal is exemplified as the BPSK signal, the present invention is not limited thereto. Namely, the demodulation apparatus in accordance with the exemplary embodiment of the present invention is applicable to a modulated signal having multiplex phase. For instance, if the modulated signal is a quadrature phase shift keying (QPSK) signal, the received signal can be demodulated in such a manner that by using clock signals having phase differences as much as 0, $\pi/4$, $\pi/2$, $3\pi/4$ relative to the carrier wave, respectively, it is oversampled at rising edges and falling edges of the clock every clock. In the same manner, if the received signal is a N-PSK signal, it can be demodulated by using clock signals having phase differences as much as 0, $\pi/N$, $2\pi/N$, $3\pi/N$, . . . $(N-1)\pi/N$ relative to the carrier wave, respectively.

Thus, if the received signal is an M-PSK signal, in order to demodulate it, at least M clock signals are required, and the rest of clock signals except a clock signal having the same phase as that of the carrier wave among the M clock signals have phase differences, which are positive number times as large as $\pi/M$ relative to the carrier wave, respectively. Also, since the sampling is carried at rising edges and falling edges of the respective clock signals, it may be preferable that during one clock period, clock signals of the same number as a value obtained by dividing the sampling number by 2 is used in demodulating the signal.

The clock signals supplied to the demodulating unit 240 and the phase detecting unit 210 from the clock control unit are synchronized clock signals. Accordingly, if the number of the synchronized clock signals is two, the synchronized clock signals can be supplied to the demodulating unit 240 and the phase detecting unit 210, in such a manner that the two synchronized clock signals are supplied to the demodulating unit 240 and the phase detecting unit 210, respectively, or the two synchronized clock signals are supplied to the phase detecting unit 210 and at the same time, one of the two synchronized clock signals, particularly, a synchronized clock signal having a phase different from that of the carrier wave is supplied to the demodulating unit 240. Also, the synchronized clock signals can be supplied to the demodulating unit 240 and the phase detecting unit 210, in such a manner that a synchronized clock signal having the same phase as that of the carrier wave is supplied to the phase detecting unit 210 and the synchronized clock signal having the phase different from that of the carrier wave is supplied to the demodulating unit 240.

FIG. 5 is a circuit diagram exemplifying the phase detecting unit 210 and the demodulating unit 240 of the demodulation apparatus in accordance with an exemplary embodiment of the present invention. Circuits illustrated in FIG. 5 include six flip-flops and five multiplexers (MUX). Each of the flip-flops is a storing element, which temporarily stores a signal received from the outside and outputs it in terms of bits to the corresponding MUXs. Each of the MUXs selectively outputs any one of signals in terms of bits inputted from the corresponding flip-flops by using clock signals.

Particularly, a first MUX 550 and a fourth MUX 565 sample the received signal by using flip-flops 510, 515, 520 and 525 and reverse levels measured at falling edges of the clock signals to output a demodulated signal to the filter 250. Also, a fifth MUX 570 and flip-flops 530 and 535 produce phase information by using signals outputted from a second MUX 555 and a third MUX 560, and output the produced phase information to the clock control unit 220.

As apparent from the foregoing description, according to the exemplary embodiments of the present invention, the demodulation method and the apparatus thereof can sample the received signal by using the phase detection and demodulate the received signal by using the sampled result. Further, the demodulation apparatus according to the exemplary embodiment of the present invention does not use a low pass filter, but the digital filter as a filter for removing a jitter from the demodulated signal, thereby allowing a size thereof to be minimized.

Although representative exemplary embodiments of the present invention has been shown and described in order to exemplify the principle of the present invention, the present invention is not limited to the specific exemplary embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A demodulation method comprising:
   receiving a modulated signal which is produced by multiplying an original signal by a carrier wave;
   detecting phase information by sampling a received signal;
   synchronizing at least one clock signal based on the detected phase information;
   oversampling the received signal by the synchronized clock signal to generate an oversampled result; and
   demodulating the received signal based on the oversampled result,
   wherein the oversampling comprises measuring levels of the received signal at rising edges and falling edges of the synchronized clock signal, and
   wherein the demodulating comprises not reversing the levels measured at the rising edges of the synchronized clock signals and reversing the levels measured at the falling edges of the synchronized clock signal.

2. The method of claim 1, wherein a number of synchronized clock signals is greater than two.

3. The method of claim 2, wherein the synchronized clock signal has a phase difference relative to a carrier wave included in the received modulated signal.

4. The method of claim 3, wherein the phase difference is a multiple of a value obtained by dividing $\pi$ by the number of synchronized clock signals.

5. The method of claim 1, wherein the oversampling comprises sampling the received modulated signal more than two times during a clock period.

6. The method of claim 1, further comprising removing a jitter from the demodulated received modulated signal.

7. A demodulation apparatus, comprising:
   a phase detecting unit which detects phase information by sampling a received signal;
   a clock control unit which synchronizes at least one clock signal based on the detected phase information; and
   a demodulating unit which oversamples the received signal by the synchronized clock signal, and demodulates the received signal based on oversampled result,
   wherein the received signal is a modulated signal which is produced by multiplying an original signal by a carrier wave, and
   wherein the demodulating unit measures levels of the received signal at rising edges and falling edges of the synchronized clock signal, and
   wherein the demodulating unit does not reverse the levels measured at the rising edges of the synchronized clock signal and reverses the levels measured at the falling edges of the synchronized clock signal.

8. The apparatus of claim 7, wherein a number of synchronized clock signals is greater than two.

9. The apparatus of claim 8, wherein the synchronized clock signal used by the demodulating unit has a phase difference relative to a carrier wave included in the received modulated signal.

10. The apparatus of claim 9, wherein the predetermined phase difference is a multiple of a value obtained by dividing $\pi$ by the number of synchronized clock signals.

11. The apparatus of claim 7, wherein the demodulating unit samples the received modulated signal more than two times during a clock period.

12. The apparatus of claim 7, further comprising a filter which removes a jitter from the demodulated received modulated signal.

13. The apparatus of claim 12, wherein the filter comprises a digital filter.

* * * * *